(12) United States Patent
Klinkenberg et al.

(10) Patent No.: US 6,727,650 B2
(45) Date of Patent: Apr. 27, 2004

(54) HIGH PRESSURE DISCHARGE LAMP WITH REFLECTION LAYER ON THE NECK PORTION

(75) Inventors: Klaus Klinkenberg, Aachen (DE); Holger Moench, Vaals (NL); Arnd Ritz, Heinsberg (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 84 days.

(21) Appl. No.: 10/022,169

(22) Filed: Dec. 13, 2001

(65) Prior Publication Data

US 2002/0084756 A1 Jul. 4, 2002

(30) Foreign Application Priority Data

Dec. 19, 2000 (DE) .......................... 100 63 376

(51) Int. Cl.⁷ ................................. H01J 5/16
(52) U.S. Cl. ........................ 313/635; 313/113
(58) Field of Search .................. 313/635, 634, 313/571, 572, 573, 489, 110, 113, 114, 112

(56) References Cited

U.S. PATENT DOCUMENTS

| 3,364,374 A | 1/1968 | Wilson | 313/184 |
| 5,109,181 A | 4/1992 | Fischer et al. | 313/571 |
| 5,506,464 A * | 4/1996 | Ooms | 313/113 |
| 5,676,579 A * | 10/1997 | Parham et al. | 445/58 |
| 6,084,352 A * | 7/2000 | Seki et al. | 313/635 |
| 6,108,126 A | 8/2000 | Hagiwara et al. | 359/361 |
| 2001/0048273 A1 * | 12/2001 | Seki et al. | 313/623 |

FOREIGN PATENT DOCUMENTS

| EP | 0869540 A1 | 10/1998 | H01J/61/35 |
| EP | 0989587 A1 | 3/2000 | H01J/61/35 |
| EP | 1160832 A2 | 12/2001 | H01J/61/36 |

* cited by examiner

Primary Examiner—Nimeshkumar D. Patel
Assistant Examiner—Karabi Guharay

(57) ABSTRACT

The invention relates to a high-pressure discharge lamp with a substantially elongate bulb which has two neck regions and a vacuumtight discharge chamber in a central position. The invention further relates to a reflector lamp and a projection system comprising such a high-pressure discharge lamp. A disadvantage of known lamps is formed by the too high temperatures of critical components. According to the invention, therefore, it is suggested that the high-pressure discharge lamp is provided at least partly with a reflection layer at least in a neck region. The reflection layer reflects radiation in the entire spectrum (ultraviolet, visible, infrared) and is used in particular as a heat shield layer which reflects the radiation incident on the neck region at the lamp end and acting as heat radiation, so that an additional heating is prevented or at least reduced.

1 Claim, 1 Drawing Sheet

HIGH PRESSURE DISCHARGE LAMP WITH REFLECTION LAYER ON THE NECK PORTION

BACKGROUND OF THE INVENTION

1. Field of the Invention

The invention relates to a high-pressure discharge lamp with a substantially elongate bulb which has two neck regions and a vacuumtight discharge chamber in a central position. The invention further relates to a reflector lamp and a projection system comprising such a high-pressure discharge lamp.

2. Description of Related Art

Such a high-pressure discharge lamp is known, for example, from U.S. Pat. No. 5,109,181. The high-pressure mercury vapor discharge lamp has a bulb of a highly temperature-resistant material which contains two electrodes of tungsten and a filling which is essentially formed by rare gas, mercury, and free halogen in the operational state. The highly temperature-resistant bulb may be made, for example, from quartz glass or aluminum oxide. The lamps in question have an ellipsoidal or cylindrical lamp bulb made of quartz glass. Cylindrical quartz portions merge into the bulb ends, and molybdenum foils are fused into said portions in a vacuumtight manner. Molybdenum foils are used in the regions of these vacuumtight lead-throughs, which bound the discharge chamber, because a more vacuumtight current supply can be achieved in this manner. The molybdenum foils are connected to respective inner electrodes and outer current supply wires. During lamp operation, the filling of the bulb is excited and is in a discharge state.

Gas discharge lamps of this kind, which are denoted High Intensity Discharge (HRD) lamps, are preferred for use as light sources in digital projection systems such as video projectors. The lamps are usually inserted in a reflector during operation, so that often a closed reflector system comprising a lamp and a reflector is offered as a reflector lamp for reasons of safety. The size reduction requirement for projectors leads to the necessity also to reduce the size of the reflector systems. A major impediment to miniaturizing is formed here by the excessively high temperatures of critical components. For example, a lamp with a substantially elongate bulb is usually arranged in the optical axis in the reflector, so that the discharge chamber is in the focus. The length of the free end of the lamp bulb is then determined by the thermal conductivity of the bulb material (for example quartz glass). Since the molybdenum strip in the outer region of the lead-through can react with the oxygen present in the air and this reaction leads to a shortened product life at temperatures above 350° C., a sufficient amount of heat must be removed from the portion between the hot discharge chamber and the position of the molybdenum strip. The energy transported towards the bulb end through thermal conduction must be passed on to the surroundings through convection and radiation.

If the lamp is arranged in a closed system with a reflector and a front plate (reflector lamp) for reasons of safety, a size reduction of the reflector system will lead to air temperatures in the interior which may bring the temperature of the molybdenum strip close to the limit temperature. Lamp life is shortened thereby. For this reason known lamps have the disadvantage that this distance can be shortened to a limited degree only, so that the size of the lamp and of the reflector system cannot be reduced.

BRIEF SUMMARY OF THE INVENTION

It is accordingly an object of the invention to provide a high-pressure discharge lamp which offers a longer useful life thanks to improved thermal properties.

This object is achieved by means of a high-pressure discharge lamp which is provided at least partly with a reflection layer in a neck region. The reflection layer reflects radiation over the entire spectrum (ultraviolet, visible, infrared). The reflection layer is used in particular as a heat shield layer which reflects the radiation incident on the neck region at the lamp end and acting as heat radiation, so that an additional heating is prevented or at least reduced. The additional heat radiation in the neck region of the lamp is caused, for example, by further miniaturization or by the use of ellipsoidal mirrors for reflector lamps. In contrast to widely used parabolic mirrors, which generate substantially parallel light beams, ellipsoidal mirrors offer a possibility of miniaturization because a second focus is present. Such reflectors concentrate more radiation into a beam which is aimed at the neck region of the lamp. The additional heating of the lamp by this thermal radiation is prevented by the reflection layer according to the invention. The reflection layer is accordingly preferably constructed such that it reflects radiation in the visible and infrared spectral ranges.

In a preferred further embodiment of the invention, the reflection layer is provided on the outside of the bulb in the neck region. The provision of the reflection layer on the outer surface of the finished bulb in the neck region is particularly suitable for realizing the lamp according to the invention. Known manufacturing techniques may be used. The bulb may, for example, be provided with the relevant layers in the desired region by vapor deposition. A mechanical fastening of a reflection layer in the form of a foil is also conceivable. It may be advantageous to provide the neck region with the reflection layer, but to leave the corresponding end face of the bulb uncovered.

The reflection layer may be a dielectric interference filter or a layer of a metal material or a metal oxide. The dielectric interference filter is preferably formed by an optical multilayer system which consists of dielectric layers (in particular made of metal oxide) of alternating high and low refractive index. Such multilayer systems (layer stacks) provide a very high reflection index which can be well adapted to the requirements through the choice of suitable materials and layer thicknesses. A certain spectral gradient of the reflection index may also be adjusted.

In an advantageous embodiment of the lamp according to the invention, the reflection layer is provided in the neck region over a width of at most 10 mm from the start of the bulb. It was found that a limitation of the size of the reflection layer is advantageous. The reflection layer starts at the beginning of the bulb and extends in the neck region towards the discharge chamber up to a maximum width of 10 mm on the outer surface. The reflection layer is present on the end portion of the bulb of a lamp incorporated in a reflector, which end portion is freely arranged in the opening of the reflector. The additional heating of the lamp in these regions by incident thermal radiation is to be prevented. A further coating of the bulb with a reflection layer in the vicinity of the discharge chamber, on the other hand, may hamper the radiation of the heat generated in the discharge chamber through a reduction of the average emission coefficient for the infrared wavelength ranges which are particularly important here. It is accordingly favorable for the thermal properties which are of particular influence on lamp life to limit the width of the reflection layer.

The object of the invention is furthermore achieved by means of a reflector lamp with a reflector and a high-pressure discharge lamp arranged along the optical axis in the reflector, wherein the neck region facing the reflector opening is at least partly provided with a reflection layer. The high-pressure discharge lamp according to the invention is at least partly surrounded by a reflector in the reflector lamp, so that less heat can be removed. This means that the lamp heats up even faster. Air temperatures would arise inside the reflector lamp, in particular in the case of a small size, which bring the temperature of the molybdenum strip close to the critical limit temperature. The reflector lamp with a high-pressure discharge lamp according to the invention offers particular advantages over known lamps if the reflector is closed off at the front with a transparent disc.

Advantageously, a cold-light mirror is arranged on the inside of the reflector, and the reflection layer is formed by a metal oxide, in particular by zirconium oxide, or a dielectric interference filter. The insides of reflectors are often coated with a cold-light mirror. A coating with a dielectric interference filter or a metal oxide is particularly suitable as a reflection layer in that case, because the spectral reflection properties match the spectrum reflected by the cold-light mirror well. Similarly, a reflection layer of a metal material, in particular of aluminum, or a dielectric interference filter is suitable if a metal reflector layer is arranged on the inside of the reflector.

Dielectric interference filters, i.e. layer stacks with layers of different metal oxides of alternating high and low refractive index, are particularly suitable for use as heat protection layers on the bulb. The reflectivity of the reflection (or mirror) layer with respect to certain wavelength ranges and the occurring angles of incidence in the specific geometric situation of the lamp bulb may be adapted through a suitable choice of the thicknesses of the individual layers of the interference filter. Better reflection values can be obtained by means of an optical multilayer system than by means of single layers. In addition, such a multilayer system has an average emission coefficient for the thermal radiation which is approximately equal to that of quartz, from which the lamp bulb is usually made. Accordingly, the reflection layer gives off the heat in a similar manner as the uncoated bulb of the lamp. By contrast, aluminum reflection layers have, for example, a lower emission coefficient, which is why lamps with such coatings are less well capable of removing heat generated in the discharge chamber. Dielectric multilayer systems also have the advantage of a high mechanical stability, for example a high scratch resistance and a high abrasion resistance as well as a high resistance to ageing. This renders possible a simple handling of the lamp during mounting in the reflector, or in open systems also in the case of insertion or exchange of the lamp.

The object of the invention is furthermore achieved by means of a projection system with a high-pressure discharge lamp or a reflector lamp. A further reduction in size of the devices is sought in particular in projection systems. The lamps according to the invention in the various embodiments as described above are accordingly highly suitable for use in such projection systems.

BRIEF DESCRIPTION OF THE DRAWINGS

The high-pressure discharge lamp according to the invention will be explained in more detail below with reference to an embodiment. In the drawing.

DETAILED DESCRIPTION OF INVENTION

Figure 1:
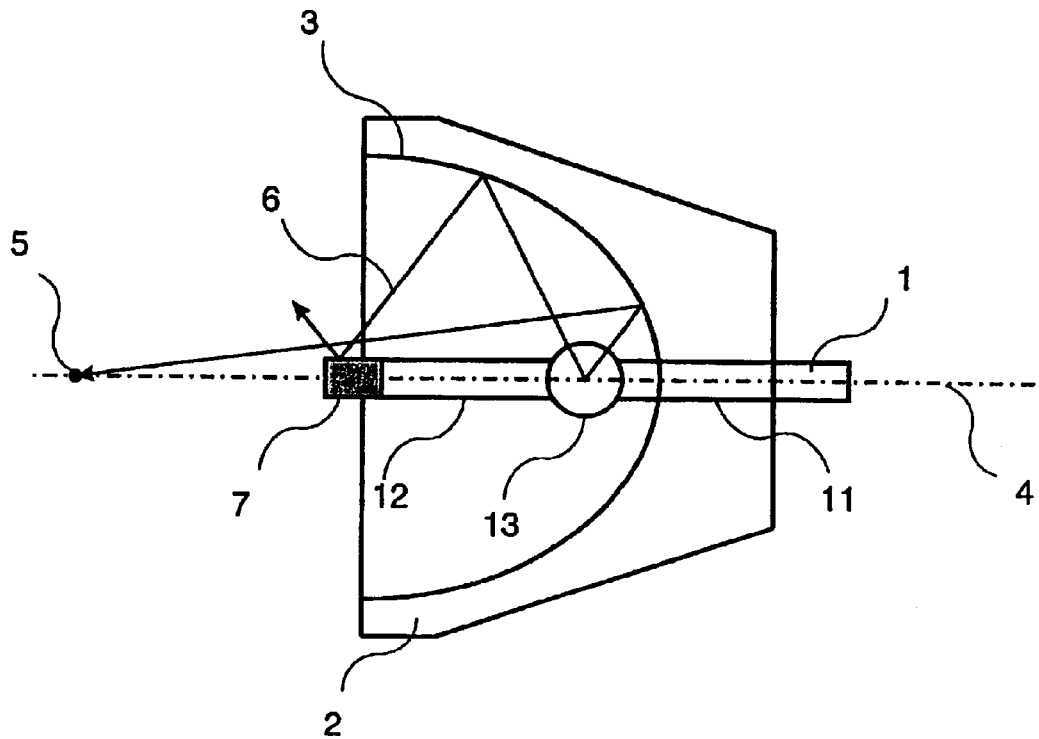
FIG. 1 shows a reflector lamp with a lamp and a reflector according to the invention.

FIG. 1 shows a high-pressure discharge lamp 1 which is arranged in a reflector 2. In the embodiment shown, the reflector 2 is provided with a cold-light mirror 3 on its inside. The elongate lamp 1 has a bulb with two cylindrical neck regions 11, 12 and an elliptical discharge chamber 13, which bulb is arranged in the reflector 2 on the optical axis 4 thereof. The radiation generated in the discharge chamber 13 is imaged on the focus 5 by the mirroring layer 3 of the reflector 2. Owing to the finite dimensions of the light source, which is obviously not a point source but a light arc, not all the generated light is imaged in the focus 5, but part of the radiation is also reflected onto the neck region 12 of the bulb 1. The neck region 12 is provided with a reflection layer 7 at its end portion. The reflection layer 7 acting as a heat shield layer reflects the incident radiation and thus prevents an additional heating of the lamp bulb 1.

Figure 2:
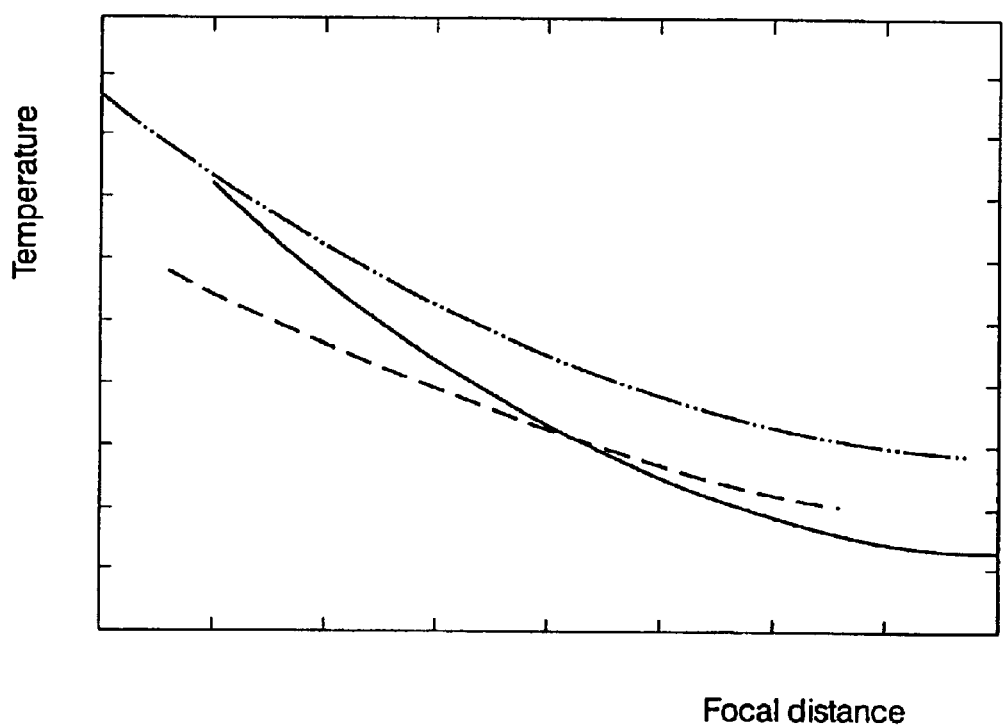
FIG. 2 is a diagram of the measured temperatures at the end of a lamp bulb without reflection layer, with a zirconium oxide layer, and with an aluminum layer.

FIG. 2 shows a comparison of the measured temperatures of a lamp without reflection layer (continuous curve), with a zirconium oxide layer (broken-line curve), and an aluminum layer (dot-dash curve). The distance between the discharge chamber 13 and the second focus of the elliptical reflector 2, onto which the lamp is focused, is plotted on the abscissa. The temperatures were measured at the lamp end in a reflector with a cold-light mirror each time.

At distances of more than 70 mm, the end of an uncoated lamp remains colder than that of a coated lamp because the emission coefficient of the quartz of the bulb 1 is higher than that of the reflection layer 7, and the thermal load of the lamp end 12 is substantially exclusively caused by thermal conduction from the discharge chamber 13. For distances smaller than 70 mm, the additional load rises owing to radiation reflected in the reflector 2 onto the lamp end 12. Substantially lower temperatures are achieved with a reflection layer 7 of zirconium oxide, thus rendering possible the construction of smaller optical systems without the bulb 1 reaching a critical temperature.

The lamp shows a higher temperature with an aluminum layer than without a layer, because a cold-light mirror was used here and the low emission coefficient of the reflection layer has a negative influence owing to a reduced radiation in the region of the lamp end, and thus a temperature rise. By contrast, a lamp 1 provided with an aluminum layer 7 and mounted in a reflector 2 with a metal reflection layer 3 exhibits lower temperatures than without a reflection layer or with a zirconium oxide layer. In this case the aluminum reflectorization reduces the thermal load because the IR radiation reflected by the reflector 2 heats the lamp end in addition to the components formed by heat conduction and absorbed light. It is apparent that a suitable reflection layer is to be chosen in dependence on the mirroring layer 3 provided in the reflector used, on the distance of the focus 5 of the reflector 2 to the lamp end, and on the length of the neck region 12. A further miniaturization of reflector lamps and of devices in which such lamps are used can thus be achieved, in particular through the use of an ellipsoidal mirror instead of a parabolic mirror.

What is claimed is:

1. A reflector lamp with a reflector having an opening and a high pressure discharge lamp arranged in the reflector along the optical axis and having a substantially elongate bulb which has two neck regions and a vacuum tight discharge chamber in a central position, characterized in that one of the neck regions faces the reflector opening and is provided with a reflection layer which extends over a width of at most 10 mm measured from the start of the bulb, wherein there is a reflecting means on the inside of the reflector which is selected from the group of a cold light mirror and a metal reflector layer and wherein if the reflecting means is a cold light mirror said reflection layer is formed by a metal oxide and if the reflecting means is a metal reflector layer said reflection layer is made of aluminum.

* * * * *